United States Patent
Cubic et al.

(10) Patent No.: US 8,848,659 B2
(45) Date of Patent: Sep. 30, 2014

(54) TRACKING NETWORK RESOURCES

(75) Inventors: Ivica Cubic, Split (HR); Mattias Johansson, Solna (SE); Lea Skorin-Kapov, Zagreb (HR); Miran Mosmondor, Cakovec (HR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 729 days.

(21) Appl. No.: 12/936,877

(22) PCT Filed: May 12, 2008

(86) PCT No.: PCT/EP2008/055798
§ 371 (c)(1),
(2), (4) Date: Oct. 7, 2010

(87) PCT Pub. No.: WO2009/138119
PCT Pub. Date: Nov. 17, 2009

(65) Prior Publication Data
US 2011/0032896 A1    Feb. 10, 2011

(51) Int. Cl.
*H04W 4/00*      (2009.01)
*H04L 12/66*     (2006.01)
*H04W 36/00*     (2009.01)
*H04W 24/00*     (2009.01)
*G06F 15/173*    (2006.01)
*H04L 12/24*     (2006.01)
*H04W 84/18*     (2009.01)
*H04W 8/08*      (2009.01)
*H04L 12/12*     (2006.01)
*H04L 29/08*     (2006.01)

(52) U.S. Cl.
CPC ............... *H04L 12/24* (2013.01); *H04W 84/18* (2013.01); *G06F 15/17306* (2013.01); *H04W 8/08* (2013.01); *H04L 12/12* (2013.01); *H04L 41/00* (2013.01); *H04L 41/12* (2013.01); *H04W 24/00* (2013.01); *H04L 67/16* (2013.01); *H04L 67/12* (2013.01)
USPC ........... 370/331; 370/352; 455/440; 455/442; 455/456.1; 709/226

(58) Field of Classification Search
CPC ... G06F 15/17306; H04L 12/12; H04W 8/08; H04W 84/18
USPC ............... 370/328–331, 352–356; 455/422.1, 455/436, 440, 442, 456.1; 709/223–229
See application file for complete search history.

(56) References Cited

U.S. PATENT DOCUMENTS 7,415,548 B2 *  8/2008  Mahany et al. ................. 710/18
7,468,927 B1 * 12/2008  Battista ......................... 365/226

(Continued)

FOREIGN PATENT DOCUMENTS

EP         1 862 957 A1    12/2007
JP         2006-259953 A    9/2006
WO     WO 2007/072814 A1   6/2007

OTHER PUBLICATIONS

International Search Report, PCT/EP2008/055798, Mar. 6, 2009.

(Continued)

*Primary Examiner* — Luat Phung
*Assistant Examiner* — Kai Chang
(74) *Attorney, Agent, or Firm* — Myers Bigel Sibley & Sajovec, P.A.

(57) ABSTRACT

A method and apparatus for tracking resources in a communication network. A central resource tracking function receives a request to track a resource from a location application node. The central resource tracking function broadcasts a subscription message to a plurality of Wireless Sensor Network Gateway nodes. The subscription message includes an identifier associated with the tracked resource. The central resource tracking function then receives a subscription response message from a first Wireless Sensor Network Gateway node informing the central resource tracking function that the resource associated with the identifier is located in the Wireless Sensor Network served by the first Wireless Sensor Network Gateway node, and receiving from a second Wireless Sensor Network Gateway node a subscription rejection message.

21 Claims, 8 Drawing Sheets

(56) References Cited

U.S. PATENT DOCUMENTS

| | | | |
|---|---|---|---|
| 7,528,776 B2* | 5/2009 | Montuno et al. | 342/458 |
| 2001/0046223 A1* | 11/2001 | Malki et al. | 370/338 |
| 2004/0095932 A1* | 5/2004 | Astarabadi et al. | 370/389 |
| 2005/0159170 A1* | 7/2005 | Puranik et al. | 455/456.1 |
| 2005/0163078 A1* | 7/2005 | Oba et al. | 370/331 |
| 2006/0129691 A1* | 6/2006 | Coffee et al. | 709/230 |
| 2006/0193262 A1 | 8/2006 | McSheffrey et al. | |
| 2006/0212570 A1* | 9/2006 | Aritsuka et al. | 709/224 |
| 2006/0223546 A1* | 10/2006 | Claussen | 455/456.1 |
| 2006/0274698 A1* | 12/2006 | Twitchell, Jr. | 370/331 |
| 2007/0060127 A1* | 3/2007 | Forsberg | 455/436 |
| 2007/0073836 A1* | 3/2007 | Choi et al. | 709/217 |
| 2007/0073861 A1* | 3/2007 | Amanuddin et al. | 709/224 |
| 2007/0076650 A1* | 4/2007 | Manjeshwar et al. | 370/328 |
| 2007/0094494 A1* | 4/2007 | Banerjee et al. | 713/157 |
| 2007/0105577 A1* | 5/2007 | Bonta et al. | 455/517 |
| 2007/0118560 A1* | 5/2007 | Bornhoevd et al. | 707/104.1 |
| 2007/0133469 A1* | 6/2007 | Shin et al. | 370/331 |
| 2007/0176771 A1* | 8/2007 | Doyle | 340/539.13 |
| 2007/0177548 A1* | 8/2007 | Oyama et al. | 370/331 |
| 2007/0282988 A1* | 12/2007 | Bornhoevd et al. | 709/223 |
| 2008/0070573 A1* | 3/2008 | Dutta et al. | 455/435.1 |
| 2008/0165047 A1* | 7/2008 | Fisher et al. | 342/45 |
| 2009/0097443 A1* | 4/2009 | Pasanen et al. | 370/329 |
| 2009/0172117 A1* | 7/2009 | Bedi et al. | 709/206 |
| 2010/0046469 A1* | 2/2010 | Kang et al. | 370/331 |
| 2011/0002241 A1* | 1/2011 | Phan | 370/254 |

OTHER PUBLICATIONS

Written Opinion of the International Searching Authority, PCT Application No. PCT/PE2008/055798, Mar. 6, 2009.

Written Opinion of the International Preliminary Examining Authority, PCT Application No. PCT/EP2008/055798, Aug. 13, 2010.

International Preliminary Report on Patentability; PCT/EP2008/055798; Sep. 16, 2010.

Hunkeler et al., "MQTT-S—A Publish/Subscribe Protocol for Wereless Sensor Networks", Communication Systems Software and Middleware and Workshops, XP031279783, Jan. 6, 2008, pp. 791-798.

Li et al., "SIP-RLTS: An RFID Location Tracking System Based on SIP", RFID, IEEE 2008 International Conference, XP031252179, Apr. 16, 2008, pp. 173-182.

European Communication Corresponding to Application No. 08 750 251; Dated: Aug. 12, 2011; 6 pages.

Japanese Office Action Corresponding to Japanese Patent Application No. 2011-508799; Mailing Date: Dec. 21, 2012; 2 Pages (Foreign Text Only).

* cited by examiner

TRACKING NETWORK RESOURCES

CROSS REFERENCE TO RELATED APPLICATION

The application is a 35 U.S.C. §317 national stage application of PCT international Application No. PCT/EP2008/055798, filed on 12 May 2008, the disclosure and content of which is incorporated by reference herein in its entirety. The above-referenced PCT International Application was published in the English language as International Publication No. WO 2009/138119 A1 on 19 Nov. 2009.

TECHNICAL FIELD

The invention relates to the field of tracking network resources, and in particular to the field of tracking network resources in a Wireless Sensor Network.

BACKGROUND

Wireless Sensor Networks (WSNs) include a plurality of spatially distributed sensor nodes that monitor physical conditions in a real world environment, and are used in environment and habitat monitoring, traffic control, home automation and stock tracking. Most current solutions that utilize sensors are vertical in their implementation. The operator is used as a bit pipe, and each WSN implementation uses its own protocols. As in the case of classical networks, applications that use data collected by sensor nodes in the WSN have their "channel" towards the sensor nodes. Each application is tailor-made containing specialized and in most instances proprietary components. Furthermore, there is no cross utilisation of data and sensors between different services. This situation leads to high development costs and relatively high costs for implementations and operating. Typical examples of such applications are industrial applications such as fleet management and logistics.

The integration of a WSN with a telecommunication network offers a network environment convenient for new and appealing WSN based services, for example smart home appliances, services for disabled and elderly people and so on. Furthermore, such integration may allow more flexible and efficient use of collected data. Data collected from sensor nodes comprising a WSN can be made available to a communications network via a WSN gateway.

Horizontal solutions offer a layered system design, based on the reuse of common functions and services in a distributed (networked) system. Different layers include clients (e.g., users, applications), middleware control functions, and sensor networks. Such an approach offers a clear separation between layers and hides WSN specifics from clients. Middleware functions provide a mapping between client requests and available WSNs.

Location based services (LBS) refer to a family of services that are based on utilizing information regarding the location of resources. Resources include anything that can be monitored, such as an object, person or animal. Location acquiring can be network or device based. In device-based positioning, using for example Global Positioning System (GPS), all position calculation is performed locally at the device (or resource). In order to use a location aware application, the locally calculated position has to be transmitted to the application, to make the application aware of the location of the resource.

LBSs in WSNs are mainly network-based. While device-based positioning guarantees privacy and full control of the locally calculated position disclosure, a problem with network-based positioning is that the positioned resource (which may be, for example, an end user in a communications network) is not in full control of its position data, thus creating concerns regarding privacy. For WSN monitoring, tracking, and resource controlling applications, strict security and privacy requirements may be imposed by the owners of resource tracking tags.

With regards to resource tracking, when a tracked resource moves from one WSN cover area to another, this may be referred to as roaming or handover. Sensor data for the roaming tracked resource must be acquired in a scalable way. An existing solution to track resources includes using a Session Initiation Protocol (SIP) subscription event framework and principles as defined by the IETF. In this case a central monitoring node sends an initial subscription (SIP SUBSCRIBE) for location information to each covered WSN. Each WSN accepts this subscription and is able to seamlessly notify (using the SIP NOTIFY message) the central monitoring node when a resource enters its cover area. A problem with this solution is scalability. If m is the number of active tracked resources and n is the number of WSNs, then this solution require m x n active subscription sessions with the central monitoring node, as IETF standards require that a SIP NOTIFY cannot be sent unless there is an active session.

An alternative solution, also based on the use of IETF standards, is to improve the usage of the SIP publication framework. Each WSN sends a SIP PUBLISH message to the central monitoring node with a list of resources for which the WSN has location information. When handover is detected, a WSN sends an updated PUBLISH message to the central monitoring node. In this case, the central monitoring node would know which WSN has the location information for a particular resource, and so does not need to broadcast a subscription to all WSNs. A problem with this approach is that there may be many resources whose location can be determined by a WSN, but are not of interest to the central monitoring node. With resources frequently moving from one WSN cover area to another, there is redundant signalling traffic as each WSN publishes changes to the central monitoring node even if there is no location aware application that is interested in signalled resource location information.

There are therefore issues with maintaining privacy and monitoring roaming tracked resources in a way that optimized network traffic.

SUMMARY

According to a first aspect of the invention, there is provided a method of tracking resources in a communication network. A central resource tracking function receives a request to track a resource from a location application node. The central resource tracking function broadcasts a subscription message to a plurality of Wireless Sensor Network Gateway nodes. The subscription message includes an identifier associated with the tracked resource. The central resource tracking function then receives a subscription response message from a first Wireless Sensor Network Gateway node informing the central resource tracking function that the resource associated with the identifier is located in the Wireless Sensor Network served by the first Wireless Sensor Network Gateway node, and receiving from a second Wireless Sensor Network Gateway node a subscription rejection message. In this way, the central resource tracking function becomes aware of the Wireless Sensor Network in which the resource is located without requiring an active subscription with all Wireless Sensor Network Gateway nodes and without needing to receive signalling relating to nodes that the central resource tracking function is not interested in.

As an option, the second Wireless Sensor Network Gateway node stores a record of the subscription request. This allows the second WSN Gateway node to be aware that the central resource tracking node is interested in tracking the location of the resource, and this information can be used if the resource moves into an area served by the second WSN Gateway node. As a further option, if the second WSN Gateway node, determines that the resource has moved to the WSN served by the second WSN Gateway node, then a determination is made as to whether a record of a subscription request exists for the resource associated with the identifier. If so then the central resource tracking function is informed that the resource associated with the identifier has moved to the WSN served by the second WSN Gateway node.

Optionally, the method comprises determining at the first WSN Gateway node that the resource has moved out of the WSN served by the first WSN Gateway node, and terminating the subscription with the central resource tracking function.

In order to maintain privacy of the tracked resource, the central resource tracking function optionally maps and stores the identifier associated with the tracked resource to an identity of the tracked resource received from the location application node. To further increase security and privacy, the method optionally comprises changing the identifier associated with the tracked resource to a new identifier associated with the tracked resource, and mapping and storing the new identifier associated with the tracked resource to the identity of the tracked resource.

As an option, the central resource tracking function receives a request from a location application node to cancel resource tracking. On receipt of this request, the central resource tracking function broadcasts a subscription cancellation message to the plurality of WSN Gateway nodes, the subscription cancellation message including the identifier associated with the tracked resource. This informs all of the WSN Gateway nodes that the central resource tracking function is no longer interested in tracking the location of the resource.

According to a second aspect of the invention, there is provided a central resource tracking node for use in a communication network. The node is provided with a first receiver for receiving a request from a location application node to track a resource, and a processor for generating a subscription message. The subscription message includes an identifier associated with the tracked resource. A transmitter is provided for transmitting the subscription message to a plurality of WSN Gateway nodes. Furthermore, a second receiver is provided for receiving from a first WSN Gateway node a subscription response message informing the central resource tracking node that the resource associated with the identifier is located in the WSN served by the first WSN Gateway node, and receiving from a second WSN Gateway node a subscription rejection message.

Optionally, the node is provided with a memory for storing a mapping between the identifier associated with the tracked resource and the identity of the tracked resource received from the location application node. This improves the privacy of the identity of the tracked resource.

According to a third aspect of the invention, there is provided a Wireless Sensor Network Gateway node. The WSN Gateway node is provided with a receiver for receiving from a central resource tracking node a subscription request message. The message includes an identifier associated with a tracked resource. The WSN Gateway node is also provided with a processor for determining whether the tracked resource is located in a WSN served by the WSN Gateway node. A transmitter is provided for, in the event that the resource associated with the identifier is located in the WSN, sending to the central resource tracking node a subscription response message, and in the event that the resource associated with the identifier is not located in the WSN, sending to the central resource tracking node a subscription rejection message.

The WSN Gateway node is optionally provided with a memory for storing a record of the subscription request message. In this case, the WSN Gateway node is optionally also provided with an input for determining that a new resource has moved to the Wireless Sensor Network served by the Wireless Sensor Network Gateway node, wherein the processor is arranged to determine whether a record of a subscription request exists for the new resource and the transmitter is arranged to, in the event that such a determination is made, transmit to the central resource tracking node a message informing the central resource tracking node that the resource has moved to the WSN served by the WSN Gateway node.

As an option, the WSN Gateway node is provided with an input for determining that the resource has moved out of the WSN served by the WSN Gateway node. In this case, the transmitter is arranged to transmit to the central resource tracking node a message terminating the subscription with the central resource tracking node.

DETAILED DESCRIPTION

Figure 1:
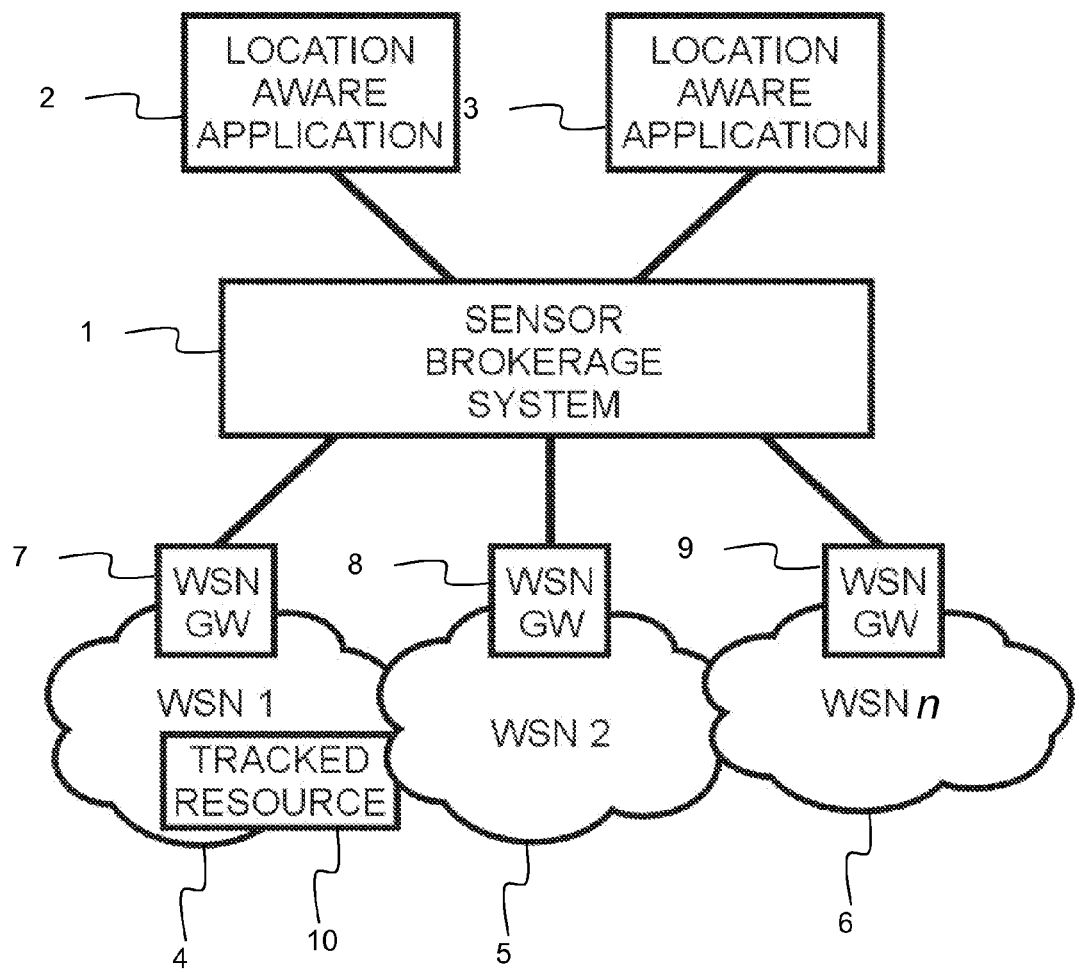
FIG. 1 illustrates schematically in a block diagram a network architecture according to an embodiment of the invention.

Referring to FIG. 1, a Sensor Brokerage System (SBS) function 1 is provided to act as a central resource monitoring node. Location aware applications 2, 3 can access the SBS 1 to find information on a tracked resource. The SBS 1 can communicate with various Wireless Sensor Networks (WSNs). In this example, WSN1 4, WSN2 5 and WSNn 6 are shown, which communicate with the SBS 1 via WSN gateways 7, 8 and 9 respectively. A tracked resource 10 is also shown, currently residing in the area of WSN1 4. The tracked resource is provided with some way of identifying the resource 10 to a WSN 1, such as a tracking tag. The tracking tag may be as simple as a RFID tag, or can have a processor that generates a presence tag ID. The tracked resource may be aware that it is to be tracked, in which case it may be responsible for disclosing its WSN identification to the SBS in a secure way. Alternatively, a resource that is not aware of tracking is disclosed to the SBS by a third party interested in tracking the resource. The term "resource" is used herein to refer to anything that can be tracked, and can include an object such as physical goods or a person, or may also include tracking of any sensor readings that may move throughout a region covered by a WSN. An example of this is, for example, tracking the movement of a chemical cloud across a region covered by the WSN.

The SBS 1 acts as a middleware between location aware applications 2, 3 and WSNs 4, 5, 6 responsible for collecting actual position-related data for the tracked resource 10. As such, the SBS 1 offers a horizontal-services approach and hides WSN specifics from application developers.

The SBS 1 is considered a trusted entity responsible for resolving the identity of a resource tracking tag and returning necessary information (e.g., positioning information) to the application 2. The actual resource identity is thereby hidden from the WSN 4.

The tracking tag does not directly identify the tracked resource 10. Instead, it may be an arbitrarily assigned code. The SBS 1 can obtain the coded information and map it to an identity of the tracked resource 10. In this way, a location aware application 1 can be made aware of the location of the tracked resource 10, whilst the WSN 4 has no way of identifying the tracked resource 10.

Figure 2:
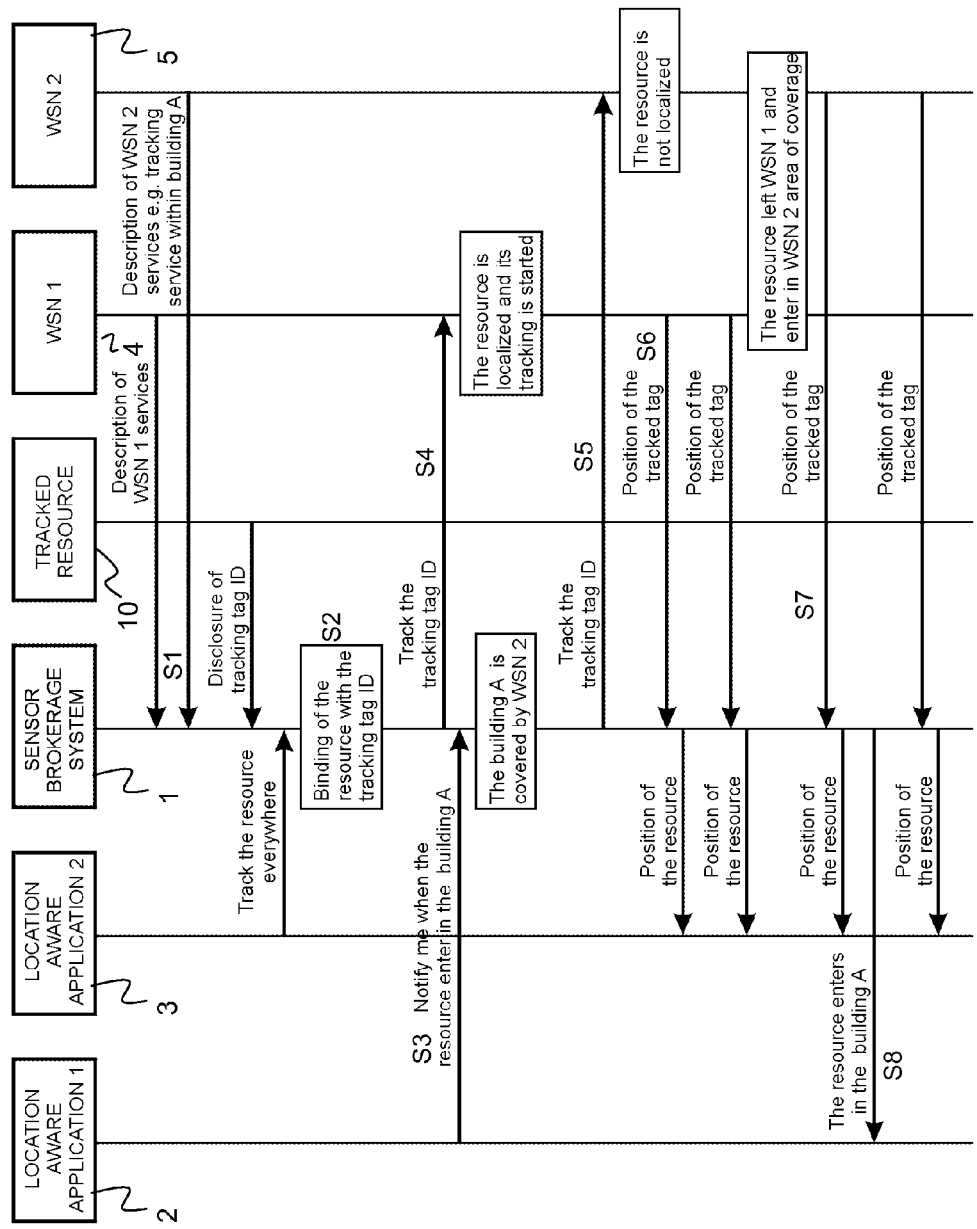
FIG. 2 is a signalling diagram showing signalling required to maintain privacy of tracked resources according to an embodiment of the invention.

The basic concept is illustrated in FIG. 2. WSN1 4 and WSN2 5 make the SBS 1 aware S1 of their services. The SBS binds S2 the tracking tag ID with the tracked resource 10 to allow it to track the resource 10. A Location Aware application 2 instructs S3 the SBS 1 to make it aware when a resource having the tracking tag ID enters the area covered by WSN2 5. In this example, WSN2 5 covers building A, and so the location aware application is requesting notification when the tracked resource enters building A. The SBS 1 sends messages S4, S5 to WSN1 4 and WSN2 5 to track the tracked resource 10. The resource is initially located in WSN1 4. WSN1 4 provides S6 the position of the tracked tag to the SBS 1. When the tracked resource 10 leaves WNS1 4 and enters WSN2 5, WSN2 5 sends a message S7 to the SBS 1 informing the SBS 1 of the position of the tracked tag. The SBS 1 maps the tracked tag to the identity of the tracked resource 10, and sends a message S8 to location aware application 2 to inform it that the resource has entered building A. In this way, the privacy of the resource is maintained because the resource is not identified between the WSNs 4, 5 and the SBS 1.

The disclosure of the resource/tracking tag ID pair can be done off line or on line. Different mechanisms can be deployed in order to prevent disclosure of the resource/tracking tag ID pair to a third party, such as the generation of a new temporary random tracking tag ID for every session. Another way of minimizing the possibility for external parties to track the entity is to let the tracked device emit r, hash (r|| tag ID) where r is a random number and hash is a one way function. This effectively makes it impossible to track the device without knowledge of the tag ID.

To summarize, the SBS 1 creates and maintains a record with the resource/tracking tag ID pair. The location aware application 2 queries the SBS 1 for the position of the resource using a signalling protocol such as SIP. The SBS 1 substitutes the resource identity with its valid tracking tag ID and queries all sensor networks, i.e., WSN gateways that provide location services for the tracking tag type of technology using a signalling protocol such as SIP. The SBS 1 uses event notification mechanisms to subscribe to WSN gateways to receive updates of the tracking tag location.

WSN gateways publish their location services to the SBS 1. Publishing may include area of coverage and location metrics as well as global references such as geographical coordinates in order to place the WSN area of coverage into a global location context. Publishing can be off line or on line.

Another aspect of the SBS 1 is the support for seamless roaming of the tracked resource 10 between WSNs. When a resource tracking request is received by the SBS 1, the SBS broadcasts location subscriptions to find out which WSN has the required resource location information. In this way, the SBS also implicitly informs other WSNs which do not currently have the required information to track the particular resource in the case of handover. The location subscription is accepted only by the WSN that currently knows the resource location. Other WSNs formally reject the subscription, but keep a list of resources whose locations have been requested by the SBS 1. The list is referred to as a resource record list. This allows for so-called "one sided statefullness", since the SBS 1 receives subscription rejections and does not have to monitor the state of each sent subscription. When handover occurs, the resource record list maintained by a WSN will allow the WSN to inform the SBS 1 about location awareness for the resource whose location information has been previously requested. The following description provides an example of this, and assumes that communication between the SBS 1 and WSNs is based on the SIP protocol, although it will be appreciated that other communication protocols may be used.

Figure 3:
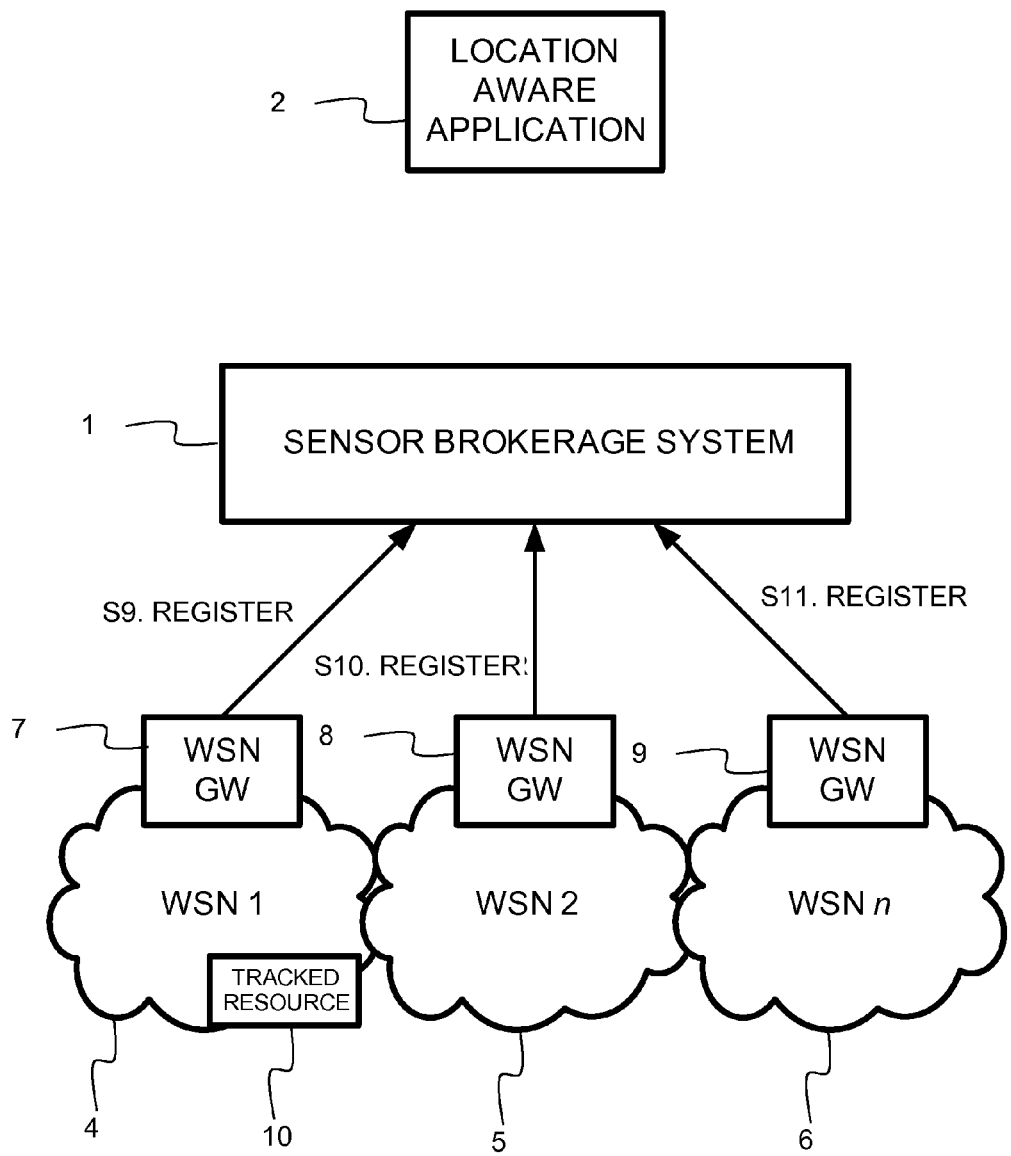
FIG. 3 illustrates schematically in a block diagram registration of Wireless Sensor Networks with a central resource monitoring function according to an embodiment of the invention.

Referring now to FIG. 3, each WSN GW 7, 8, 9 registers each WSN 4, 5, 6 with the SBS 1 by sending a SIP REGISTER request S9, S10, S11 respectively. In this example, the tracked resource 10 in question is located in the area covered by WSN 1 4.

Figure 4:
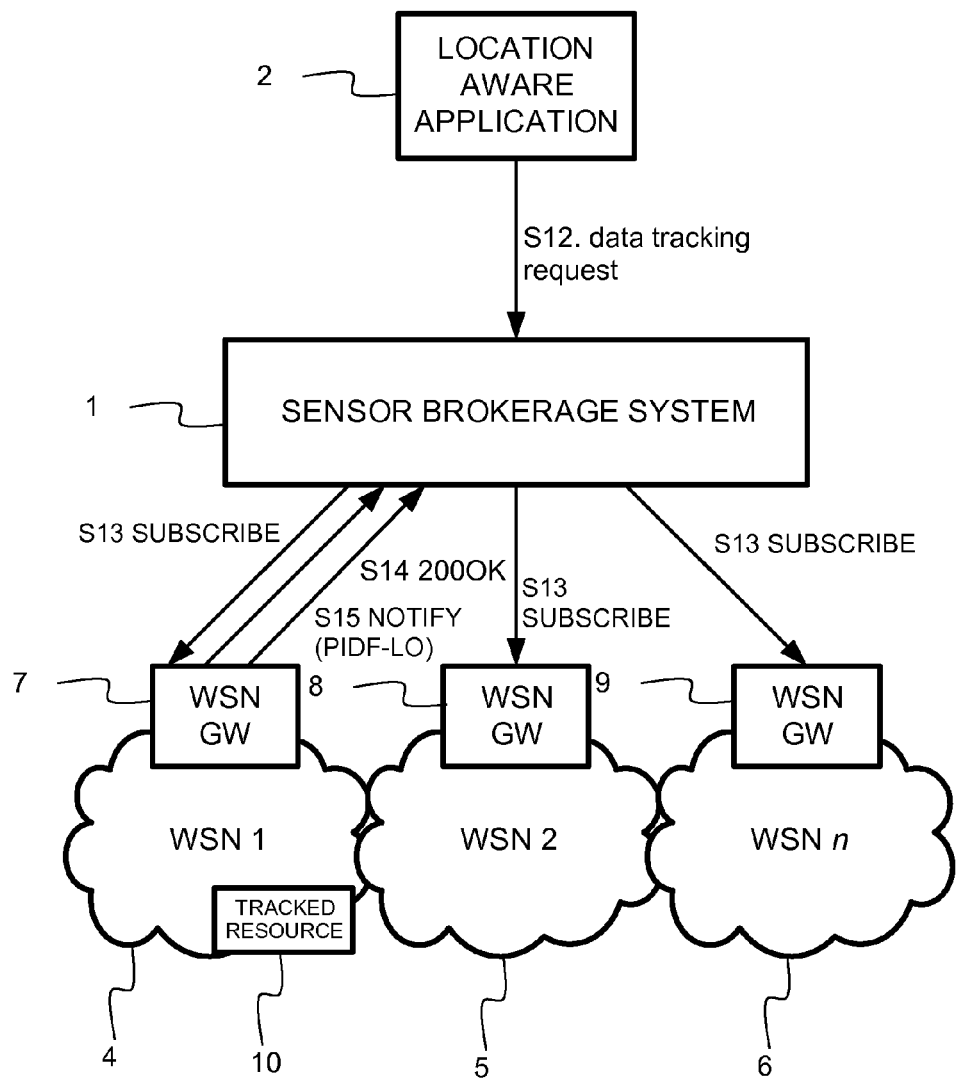
FIG. 4 illustrates schematically in a block diagram initiation of resource tracking by a central resource monitoring function according to an embodiment of the invention.

Referring now to FIG. 4, when a location aware application 2 initiates a resource tracking request S12, the SBS 1 starts procedures to find out which WSN knows the requested resource location information. A location subscription (SIP SUBSCRIBE) S13 is sent by the SBS 1 to each WSN 4, 5, 6, the message including information identifying the tracked ID tag. A location filter event definition may be included in the message body to indicate to each WSN 4, 5, 6 the conditions under which the WSN should send a notification (e.g., when a resource enters a particular area).

In this example, the WSN GW 7 of WSN1 4 knows that the resource having the tracked ID tag is in its area, and so respond(s) with a 200 OK message S14. Other WSNs 5, 6 that do not know the resource location respond with a 404 Not Found message (not shown).

The WSN 4 that accepts the subscription responds with SIP NOTIFY requests S15 carrying location information, while other WSNs 5, 6 keep a record of the tracked ID tags in a resource record list. The SIP NOTIFY contains a Presence Information Data Format Location Object (PIDF-LO), enabling the encapsulation of location information within a presence document (according to IETF RFC 4119).

Figure 5:
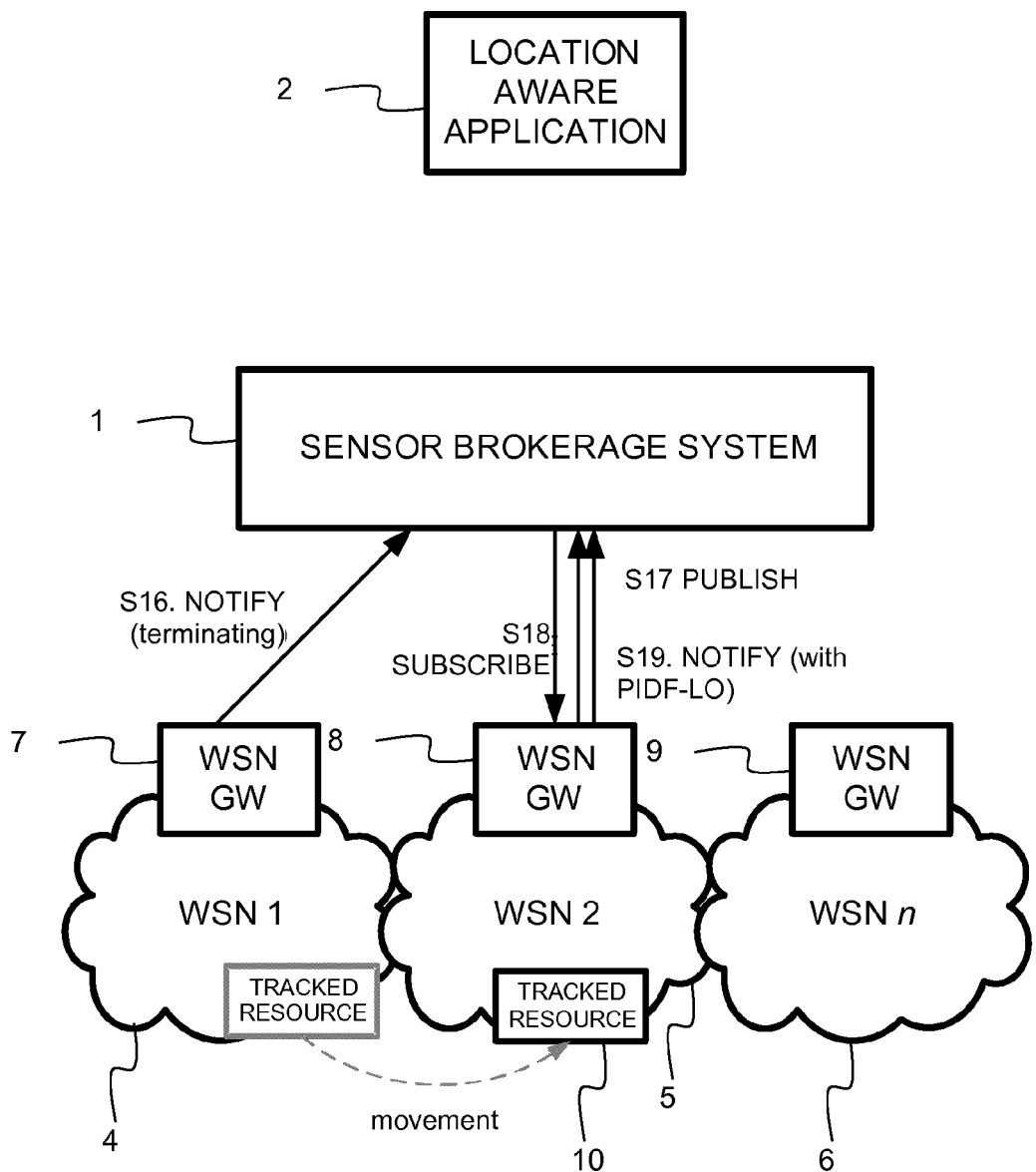
FIG. 5 illustrates schematically in a block diagram initiation of a handover procedure when a resource moves from one Wireless Sensor Network to another according to an embodiment of the invention.

Considering now the case where the tracked resource moves from WSN1 4 to WSN2 5, and referring to FIG. 5, if WSN1 4 can no longer determine the location of the tracked ID tag, it terminates the subscription by sending a terminating SIP NOTIFY request S16 to the SBS 1. However, WSN1 4 keeps a record of the tracked ID tag in the case the resource moves back to the WSN1 4 coverage area.

WSN2 5 detects that a resource (having a tracked ID tag from a resource record list) has entered its coverage area, and so because it knows from the record of tracked ID tags that the resource having this ID is being tracked by the SBS 1, sends a SIP PUBLISH method S17 to the SBS 1 to inform the SBS 1 that WSN2 5 is the new designated WSN for the resource having the tracked ID tag. After the SBS 1 receives this SIP PUBLISH method, it creates and sends a new subscription (SIP SUBSCRIBE request) S18 to WSN 2, 5. WSN2 5 responds with SIP NOTIFY requests S19 carrying new tracked ID tag location information.

Figure 6:
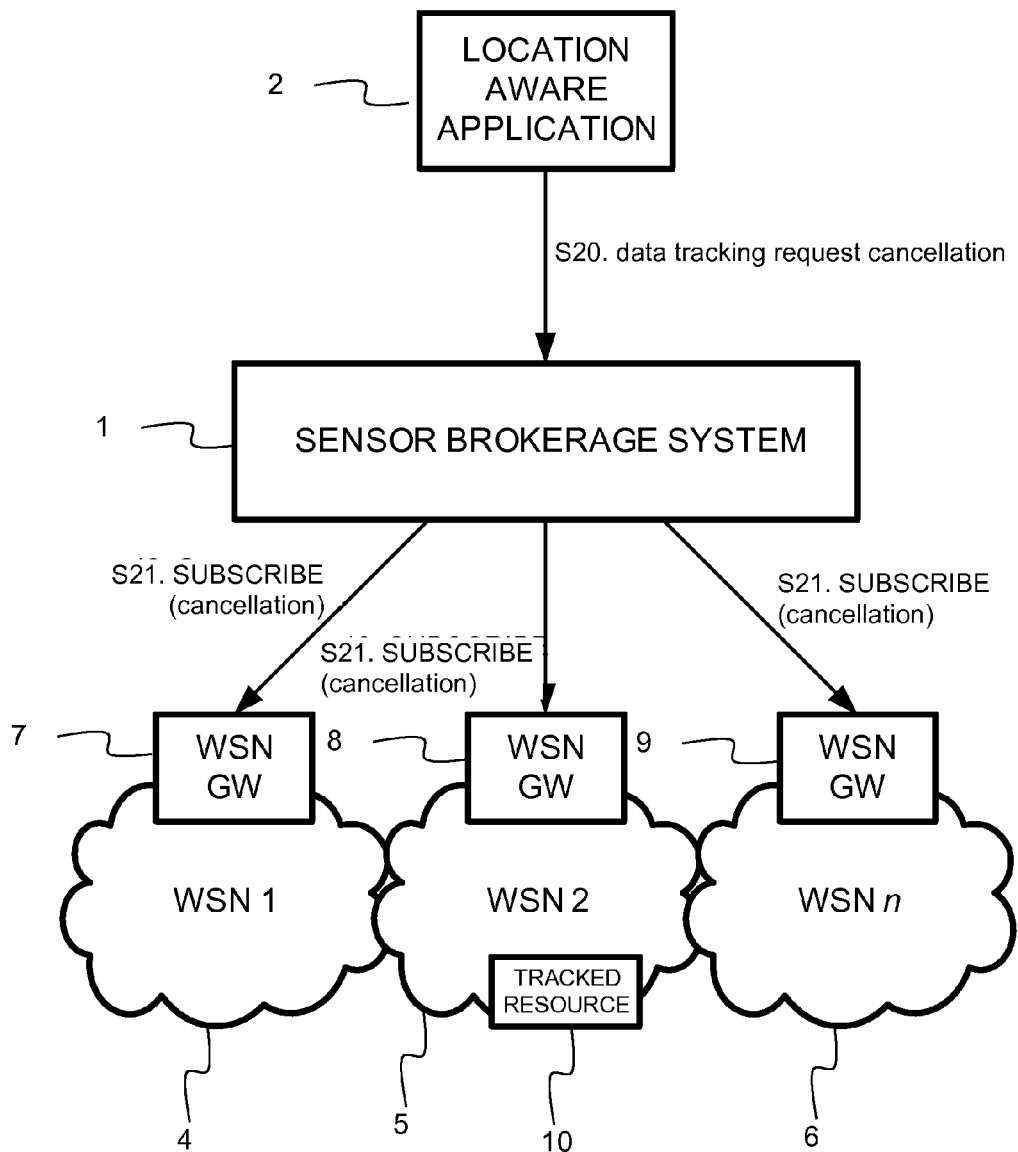
FIG. 6 illustrates schematically in a block diagram initiation of a cancellation procedure of resource tracking according to an embodiment of the invention.

Procedures for resource tracking cancellation are shown in FIG. 6. When resource tracking is no longer needed, a location aware application 2 sends a resource tracking cancellation request S20 to the SBS 1. The SBS then initiates subscription cancellation by sending SIP SUBSCRIBE messages S21 with the "Expires" header set to zero to each WSN 4, 5, 6. The designated WSN (in this example, WSN2 5, as this is the WSN where the tracked resource is currently located) removes and terminates the location subscription, while other WSNs 4, 6 must remove the tracked tag ID from the resource record list.

Figure 7:
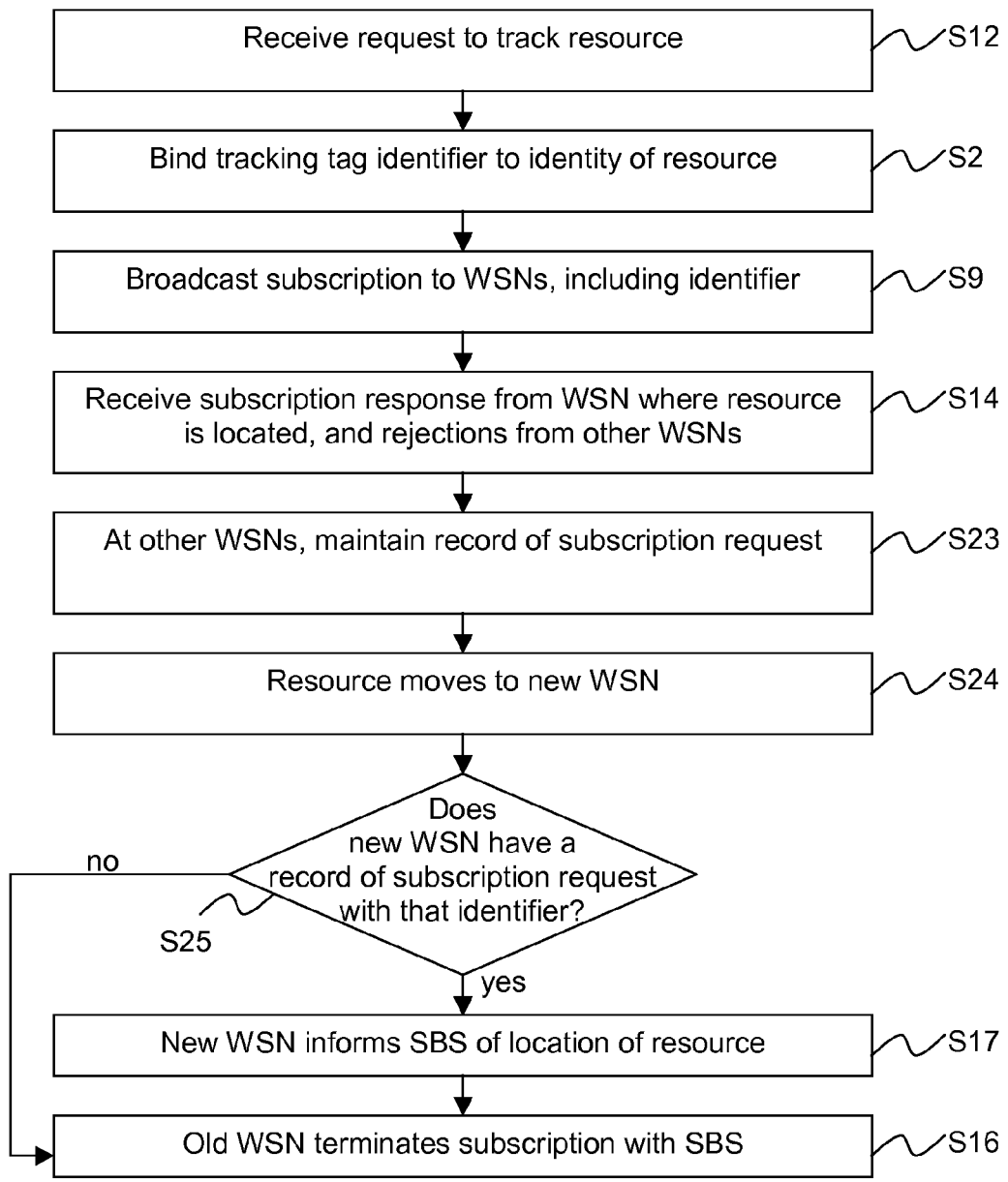
FIG. 7 is a flow diagram illustrating the steps of an embodiment of the invention.

Referring now to FIG. 7, the flow diagram illustrates how the tracking tag and the subscriptions work together to improve privacy and reduce signalling. The following numbers refer to the numbering of FIG. 7 and the previous figures, in order to maintain consistency:

S12. The SBS 1 receives a request from a location aware application 2 to track a resource 10.

S2. The SBS 1 binds an identity of the resource with a tracking tag ID and stores the binding. The tracking tag ID can only be used by the SBS to identify the resource 10.

S9. The SBS broadcasts a subscription to a plurality of WSNs 4, 5, 6, the subscription including the tracked tag ID.

S14. A WSN GW 7 that serves the WSN 4 in which the resource having the tracked tag ID is located sends a subscription response message to the SBS 1, and all other WSN GWs 8, 9 that receive the subscription message send a rejection message to the SBS 1.

S23. The WSN GWs 8,9 that sent a rejection message maintain a record of the subscription request, so that they are aware that a subscription is outstanding to track a resource associated with the matching tracked tag ID.

S24. The tracked resource 10 moves to an area covered by a new WSN 5.

S25. The WSN GW 8, or another node in the new WSN, determines whether a prior subscription request has been recorded for the resource associated with the tracked tag ID.

S17. If so, then the new WSN GW 8 informs the SBS 1 of the location of the tracked resource 10 using a SIP PUBLISH method.

S16. As the tracked resource has moved out of the area covered by the old WSN 4, the old WSN GW 7 terminates its subscription with the SBS1. Note that this step can occur before the new WSN GW 8 sends a SIP PUBLISH method to the SBS 1, and the receipt of such a subscription termination message at the SBS 1 can trigger the SBS 1 to broadcast a new SIP subscription request in order to find the location of the tracked resource 10.

Whilst the above description with respect to FIGS. 3 to 7 refers to the WSNs keeping a record of the tracked tag ID, it will be appreciated that where privacy is not an issue, the same system can be used to keep track of information that may be used to directly identify the tracked resource, such as a MAC address or a SIP address.

Figure 8:
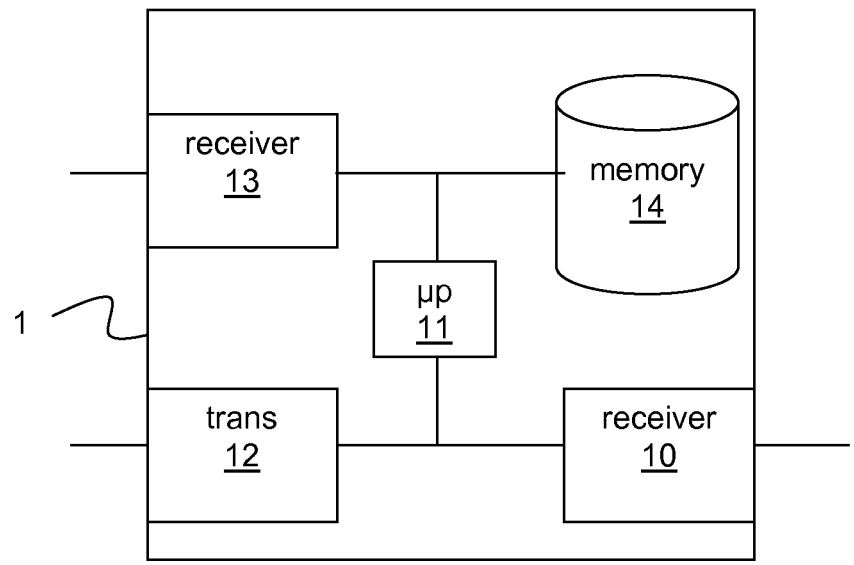
FIG. 8 illustrates schematically in a block diagram a node having a resource monitoring function according to an embodiment of the invention.

Referring now to FIG. 8, there is illustrated a SBS function node according to an embodiment of the invention. The SBS 1 function node comprises a first receiver 10 for receiving messages from location aware applications 2, and a second receiver 13 for receiving messages from WSN gateways 7, 8, 9. Of course, the two receivers may be embodied in the same physical device. A processor 11 is provided for processing and generating messages, and a transmitter 12 is also provided for sending messages to location aware applications 2, 3 and WSN gateways 7, 8, 9. The SBS 1 further comprises a memory 13 for storing information relating to tracked resources and tracked tag IDs.

Figure 9:
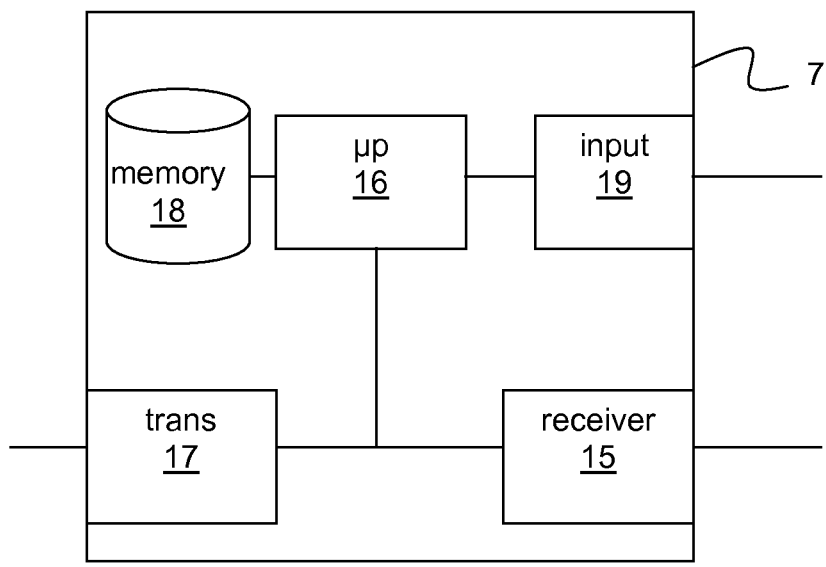
FIG. 9 illustrates schematically a Wireless Network Gateway node according to an embodiment of the invention.

Referring now to FIG. 9, there is illustrated a WSN GW 7 according to an embodiment of the invention. The WSN GW 4 comprises an input 19 for receiving information relating to a tracked resource 10 located in an area covered by the WSN 4. A processor 15 is provided for processing and generating messages. Furthermore, a transmitter 17 and a receiver 15 are provided for sending messages to and receiving messages from a SBS 1. A memory 18 is provided for storing information relating to tracked resources in the area covered by the WSN 4, and for maintaining a record of resources tag IDs for which the WSN GW 7 has received a subscription request, as described above. A processor 16 is also provided for generating messages.

The invention reduces the signalling required when a tracked resource moves between WSNs, and improves the privacy of information that may be used to identify a tracked resource. WSNs and their positioning capabilities are integrated with telecommunications networks supporting full control of privacy disclosure.

It will be appreciated by the person of skill in the art that various modifications may be made to the above-described embodiments without departing from the scope of the present invention. For example, whilst the above description refers to acquiring the location of resources in a wireless network, the resources referred to may be any object, such as goods, a person, and so on. The term "resources" refers to anything that moves in a WSN that can be tracked. An example of this is, for example, tracking a chemical cloud as it moves through an area.

The following abbreviations have been used in the description:
WSN Wireless Sensor Network
LBS Location based services
GPS Global Positioning System
SIP Session Initiation Protocol
IETF Internet Engineering Task Force
RFID Radio Frequency Identification
PIDF-LO Presence Information Data Format Location Object

The invention claimed is:

1. A method of tracking resources in a communication network, the method comprising:
at a central resource tracking node, receiving a request from a location application node to track a resource, wherein the tracked resource is a chemical cloud of physical elements;
broadcasting a subscription message from the central resource tracking node to a plurality of Wireless Sensor Network Gateway nodes, the subscription message including an identifier associated with the tracked resource;
receiving from a first Wireless Sensor Network Gateway node a subscription response message in response to the subscription message informing the central resource tracking node that the tracked resource associated with the identifier is located in a Wireless Sensor Network served by the first Wireless Sensor Network Gateway node; and receiving from a second Wireless Sensor Network Gateway node a subscription rejection message.

2. The method according to claim 1, further comprising:
at the second Wireless Sensor Network Gateway node, storing a record of the subscription message.

3. The method according to claim 2, further comprising:
at the second Wireless Sensor Network Gateway node, determining that the tracked resource has moved to a Wireless Sensor Network served by the second Wireless Sensor Network Gateway node;
determining whether a record of the subscription message exists for the tracked resource associated with the identifier; and
in the event that a record of the subscription message exists for the tracked resource associated with the identifier, informing the central resource tracking node that the tracked resource associated with the identifier has moved to the Wireless Sensor Network served by the second Wireless Sensor Network Gateway node.

4. The method according to claim 1, further comprising:
at the first Wireless Sensor Network Gateway node,
establishing a subscription associated with the subscription message;
determining that the tracked resource has moved out of the Wireless Sensor Network served by the first Wireless Sensor Network Gateway node; and
terminating the subscription in coordination with the central resource tracking node responsive to determining that the tracked resource has moved out of the Wireless Sensor Network served by the first Wireless Sensor Network Gateway.

5. The method according to claim 1, further comprising:
at the central resource tracking node, mapping and storing the identifier associated with the tracked resource to an identity of the tracked resource received from the location application node, wherein the identifier and the identity are different.

6. The method according to claim 5, further comprising:
changing the identifier associated with the tracked resource to a new identifier associated with the tracked resource, wherein the identifier and the new identifier are different; and
mapping and storing the new identifier associated with the tracked resource to the identity of the tracked resource, wherein the new identifier and the identity are different.

7. The method according to claim 5, wherein the identifier comprises a temporary random identifier.

8. The method according to claim 5, further comprising:
receiving a random number and a one way function hash from the tracked resource, wherein the identifier is based on the random number and the one way function hash.

9. The method according to claim 1, further comprising:
at the central resource tracking node, receiving a request from the location application node to cancel resource tracking; and
broadcasting a subscription cancellation message to the plurality of Wireless Sensor Network Gateway nodes, the subscription cancellation message including the identifier associated with the tracked resource.

10. The method according to claim 1, wherein the tracked resource is a single resource and the identifier uniquely identifies the tracked resource.

11. The method according to claim 1, wherein the tracked resource is a person or object with a tracking tag.

12. The method according to claim 1, wherein the tracked resource is a set of sensor readings that move from region to region.

13. The method according to claim 1, wherein the subscription message is a session initiation protocol (SIP) SUBSCRIBE message, and wherein the subscription response message is an OK message from a Wireless Sensor Network Gateway node that knows the location of the tracked resource at the time the Wireless Sensor Network Gateway node received the SIP SUBSCRIBE message.

14. The method according to claim 1, wherein the broadcast subscription message comprises a subscription to find out which Wireless Sensor Network Gateway node has location information for the tracked resource.

15. The method according to claim 1, wherein the subscription rejection message indicates receipt of the subscription message and that the tracked resource is not located in the second Wireless Sensor Network Gateway.

16. A central resource tracking node for use in a communication network, the node comprising:
a first receiver to receive a request from a location application node to track a resource, wherein the tracked resource is a chemical cloud of physical elements;
a processor to generate a subscription message, the subscription message including an identifier associated with the tracked resource;
a transmitter to transmit the subscription message to a plurality of Wireless Sensor Network Gateway nodes; and
a second receiver to receive from a first Wireless Sensor Network Gateway node a subscription response message in response to the subscription message informing the central resource tracking node that the tracked resource associated with the identifier is located in a Wireless Sensor Network served by the first Wireless Sensor Network Gateway node, and to receive from a second Wireless Sensor Network Gateway node a subscription rejection message.

17. The central resource tracking node according to claim 16, further comprising:
a memory to store a mapping between the identifier associated with the tracked resource and an identity of the tracked resource received from the location application node, wherein the identifier and the identity are different.

18. A Wireless Sensor Network Gateway node comprising:
a receiver to receive from a central resource tracking node a subscription message, the subscription message including an identifier associated with a tracked resource, wherein the tracked resource is a chemical cloud of physical elements;
a processor to determine whether the tracked resource is located in a Wireless Sensor Network served by the Wireless Sensor Network Gateway node; and
a transmitter, in the event that the tracked resource associated with the identifier is located in the Wireless Sensor Network, to send to the central resource tracking node a subscription response message in response to the subscription message, and in the event that the tracked resource associated with the identifier is not located in the Wireless Sensor Network, to send to the central resource tracking node a subscription rejection message.

19. The Wireless Sensor Network Gateway node according to claim 18, further comprising:
a memory to store a record of the subscription message.

20. The Wireless Sensor Network Gateway node according to claim 19, further comprising:

an input to determine that a new resource has moved to the Wireless Sensor Network served by the Wireless Sensor Network Gateway node, wherein the processor is to determine whether the record of a subscription message exists for the new resource and the transmitter is to, in the event that such a determination is made, transmit to the central resource tracking node a message informing the central resource tracking node that the new resource has moved to the Wireless Sensor Network served by the Wireless Sensor Network Gateway node.

21. The Wireless Sensor Network Gateway node according to claim 18, comprising:

an input to determine that the tracked resource has moved out of the Wireless Sensor Network served by the Wireless Sensor Network Gateway node, wherein the transmitter is to, in the event of such a determination, transmit to the central resource tracking node a message terminating a subscription associated with the subscription message received from the central resource tracking node.

* * * * *

UNITED STATES PATENT AND TRADEMARK OFFICE
CERTIFICATE OF CORRECTION

PATENT NO. : 8,848,659 B2
APPLICATION NO. : 12/936877
DATED : September 30, 2014
INVENTOR(S) : Cubic et al.

It is certified that error appears in the above-identified patent and that said Letters Patent is hereby corrected as shown below:

Title page, (87), under "PCT Pub. Date", in Column 1, Line 1, delete "Nov. 17, 2009" and insert -- Nov. 19, 2009 --, therefor.

On Title Page 2, (56), under "OTHER PUBLICATIONS", in Column 2, Lines 7-8, delete "Wereless" and insert -- Wireless --, therefor.

Specification

In Column 5, Line 31, delete "application 1" and insert -- application 2 --, therefor.

In Column 8, Line 11, delete "memory 13" and insert -- memory 14 --, therefor.

In Column 8, Lines 14-15, delete "WSN GW 4" and insert -- WSN GW 7 --, therefor.

In Column 8, Line 17, delete "processor 15" and insert -- processor 16 --, therefor.

Signed and Sealed this
Fifteenth Day of March, 2016

Michelle K. Lee
*Director of the United States Patent and Trademark Office*